United States Patent
Georgakis et al.

(10) Patent No.: US 9,235,634 B2
(45) Date of Patent: Jan. 12, 2016

(54) METHOD AND SERVER FOR MEDIA CLASSIFICATION

(75) Inventors: Apostolos Georgakis, Stockholm (SE); Joakim Söderberg, Solna (SE)

(73) Assignee: TELEFONAKTIEBOLAGET LM ERICSSON, Stockholm (SE)

(*) Notice: Subject to any disclaimer, the term of this patent is extended or adjusted under 35 U.S.C. 154(b) by 208 days.

(21) Appl. No.: 13/983,875

(22) PCT Filed: Feb. 24, 2011

(86) PCT No.: PCT/SE2011/050212
§ 371 (c)(1),
(2), (4) Date: Aug. 6, 2013

(87) PCT Pub. No.: WO2012/115550
PCT Pub. Date: Aug. 30, 2012

(65) Prior Publication Data
US 2013/0325865 A1    Dec. 5, 2013

(51) Int. Cl.
*G06F 17/30* (2006.01)

(52) U.S. Cl.
CPC .... *G06F 17/30598* (2013.01); *G06F 17/30038* (2013.01)

(58) Field of Classification Search
USPC .................................. 707/737, 739; 706/45
See application file for complete search history.

(56) References Cited

U.S. PATENT DOCUMENTS

| | | | |
|---|---|---|---|
| 7,512,575 B2* | 3/2009 | Mahesh | 706/45 |
| 7,813,557 B1 | 10/2010 | Bourdev | |
| 2007/0118509 A1 | 5/2007 | Svedsen | |
| 2008/0168070 A1 | 7/2008 | Naphade et al. | |
| 2008/0208774 A1* | 8/2008 | Kim et al. | 706/12 |
| 2010/0004923 A1 | 1/2010 | Bogl et al. | |
| 2010/0030552 A1 | 2/2010 | Chen et al. | |
| 2011/0320454 A1* | 12/2011 | Hill et al. | 707/739 |

FOREIGN PATENT DOCUMENTS

JP    2008131170 A    11/2006

OTHER PUBLICATIONS

Hunter, J. et al. "Co-Annotea: A System for Tagging Relationships Between Multiple Mixed Media Objects." IEEE MultiMedia, Jul.-Sep. 2008, pp. 42-53, vol. 15, No. 3.

* cited by examiner

*Primary Examiner* — Hung T Vy
(74) *Attorney, Agent, or Firm* — Patents on Demand, P.A.; Brian K. Buchheit; Scott M. Garrett (57) ABSTRACT

The embodiments of the present invention relates to a method and system for classifying media. The classification is achieved by using annotation ontolgies and by associating bottom level concepts of the annotation ontology tree with explanatory representation data of a selected representation domain and then comparing the explanatory representation data with transformation of the media in the selected representation domain. In this way tags can be generated which corresponds to bottom level concepts of the ontology tree which corresponds to explanatory representation data which can be found in the transformed media.

16 Claims, 6 Drawing Sheets

METHOD AND SERVER FOR MEDIA CLASSIFICATION

BACKGROUND

Mankind has generated tremendous amounts of digital data, e.g. from cameras, microphones, scientific equipments etc. Out of this wealth of digital data some data is useless to be processed and/or stored whereas other data is of high importance. Digital data such as images, video, audio and text are a part of our collective and individualistic identity and are often used as building blocks for new knowledge, experiences, products, business models, etc. This means that certain data like personal photos can be used as starting points for collective or individualistic applications.

Due to the exponential growth of the availability of digital sensor equipment such as digital cameras, the Internet, mobile phones, etc, the amount of information deemed as important for preservation for either the society in general and each individual person has surpassed all the limitations of human memory, the cataloging systems and even indexing schemes that were in place the last 200 years. The sheer volume of recorded data makes it impossible to locate and retrieve past data unless they are somehow annotated.

The last passage has dire consequences for society and individuals. Existing and new knowledge will be forgotten or rendered useless because there is no economical way for cataloging, organizing and searching it.

The above situation resulted in the emergence of numerous semi-automatic and automatic solutions for media annotation. In such approaches an "intelligent" system tries to substitute a human indexer in assigning annotation tags in objects exemplified by books, photos, mp3s, etc. The success rate of such a scheme depends on the initial assumptions made for the underlying data, the system's scalability capabilities and the quality of the annotation libraries or dictionaries i.e. the actual tags that are used to annotate the data.

Figure 1:
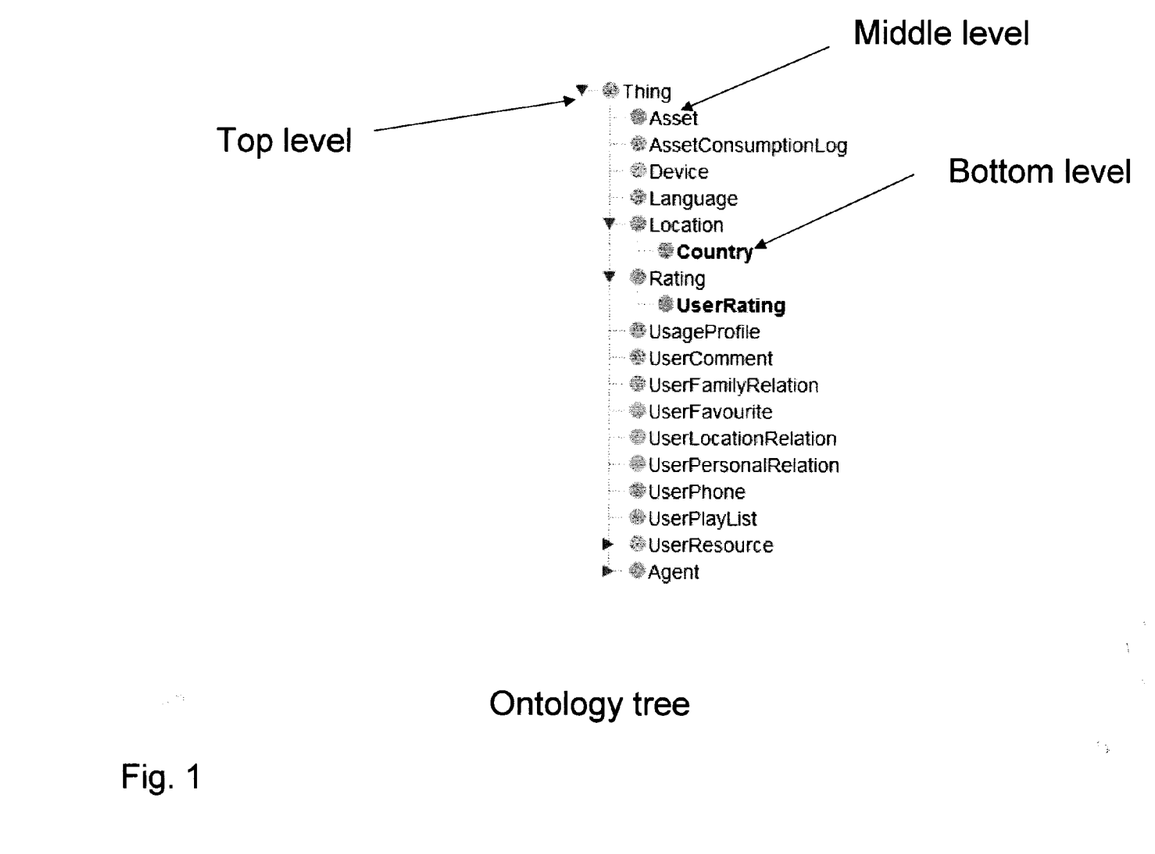
FIG. 1 exemplifies an ontology tree which can be used in the embodiments of the present invention.

Some annotation systems use ontologies, which are formal representations of knowledge as sets of concepts within a specific domain along with the relationships between those concepts. An ontology denotes a taxonomy with a set of inference rules and can be seen as a class hierarchy from abstract to more specific objects. FIG. 1 provides such a taxonomy.

The following are examples of such systems:

US20100030552A1 uses ontologies to describe real world entities and the relationship between tags by determining properties associated with tags and domains, using linguistic analysis.

US20100004923A1 describes a method for ontology-based clustering of process models e.g. manufacturing process in organization. The method involves a distance calculation unit for calculating a distance matrix, and partitioning models into set of clusters based on calculated matrix.

US20080168070A1, presents a classification method for use over Internet, involving evaluation of multimedia artifacts (e.g. photographs) using selected classifiers to determine classification (tags). The semantic tagging is enhanced by applying only classifiers from selected ontologies based on scoring.

JP2008131170A defines an apparatus for generating knowledge metadata for use in choosing multimedia content. It specifies a generation unit that generates knowledge metadata relevant to a user, based on ontology with respect to information resource after storing new concept in the ontology.

The examples above elaborate on media classification involving ontologies in some way, but none of them presents a solution on how to connect specialized concepts in an ontology to numeric measurable observations in the media domain.

SUMMARY

The embodiments of the present invention provides an automatic method and arrangement for assisting users with annotating different types of media objects such as images, video, audio, etc using enhanced structured annotations.

This is achieved by associating bottom level concepts of the annotation ontology tree with explanatory representation data of a selected representation domain and then comparing the explanatory representation data with transformation of the media in the selected representation domain. In this way tags can be generated which correspond to bottom level concepts of the ontology tree which correspond to explanatory representation data which can be found in the transformed media.

According to a first aspect of embodiments of the present invention a method for a media classification is provided. The media is classified and stored hierarchical according to at least one annotation ontology tree associated with a respective media class. In the method, at least one annotation ontology tree associated with a respective media class is retrieved. A representation domain to be used for the classification is selected and bottom level concepts of the annotation ontology tree are associated with explanatory representation data of the selected representation domain. A transformation of the media to be classified into the selected representation domain is received and the media according to the retrieved annotation ontology tree is classified by comparing the explanatory representation data with the transformed media to be classified.

According to a second aspect of embodiments of the present invention, a media classification system is provided. The media is classified and stored hierarchical according to at least one annotation ontology tree associated with a respective media class. The system is configured to retrieve at least one annotation ontology tree associated with a respective media class. The system is further configured to select a representation domain to be used for the classification and to associate bottom level concepts of the annotation ontology tree with explanatory representation data of the selected representation domain. The system is also configured to receive a transformation of the media to be classified into the selected representation domain, and to classify the media according to the retrieved annotation ontology tree by comparing the explanatory representation data with the transformed media to be classified.

The proposed solution may generate tags that are spatially and temporally aligned with the objects in the media under consideration. That is, the proposed tags can be linked with specific spatial or temporal portions of the media and not just the media at its entire. Moreover, a feedback channel may be provided which assures to the continue training or improvement of the system's performance.

Further advantages with embodiments are that it is easy to organize photos and other media using enhanced ontologies.

A further advantage is the embodiments bridge the gap between ontological concepts and observable descriptors in the signal processing domain, enabling improved media annotation systems such as video and photo tagging.

A yet further advantage with embodiments is that a learning mechanism that adjusts over time to reflect the user preferences.

DETAILED DESCRIPTION

The proposed solution according to embodiments of the present invention utilizes structured ontologies. As mentioned above, ontologies are formal knowledge representation of concepts from specific domains along with the relationships between these concepts. An ontology has a formal structure with top, middle and bottom level classes, where a class is a concept or "type-of" object or thing. An example of an ontology tree is illustrated in FIG. 1, where, top, middle and bottom level concepts are shown. It should be noted that the terms ontology and annotation ontology are used interchangeably within this specification.

According to embodiments of the present invention each bottom level concept of an annotation ontology tree is associated with explanatory representation data in a selected representation domain. Examples of explanatory representations are images if the media to be classified are photos, descriptive audio segments if the media to be classified are audio etc.

However, according to embodiments, the explanatory representations are not limited to be a representation of a representation domain which is a human perceivable domain. An example of a representation domain which is not a human perceivable domain is the transform domain, wherein such explanatory representations may be in the Discrete Cosine Transform (DCT), the Fast Fourier Transform (FFT), the Wavelets transform etc. Other examples of representation domains which are not in the human perceivable domain are the statistical domain with histograms, moments (variance, skewness, kurtosis, etc), etc. By using the different representation domains, it is possible to generalize knowledge from low level features to higher level concepts in various situations.

Figure 2:
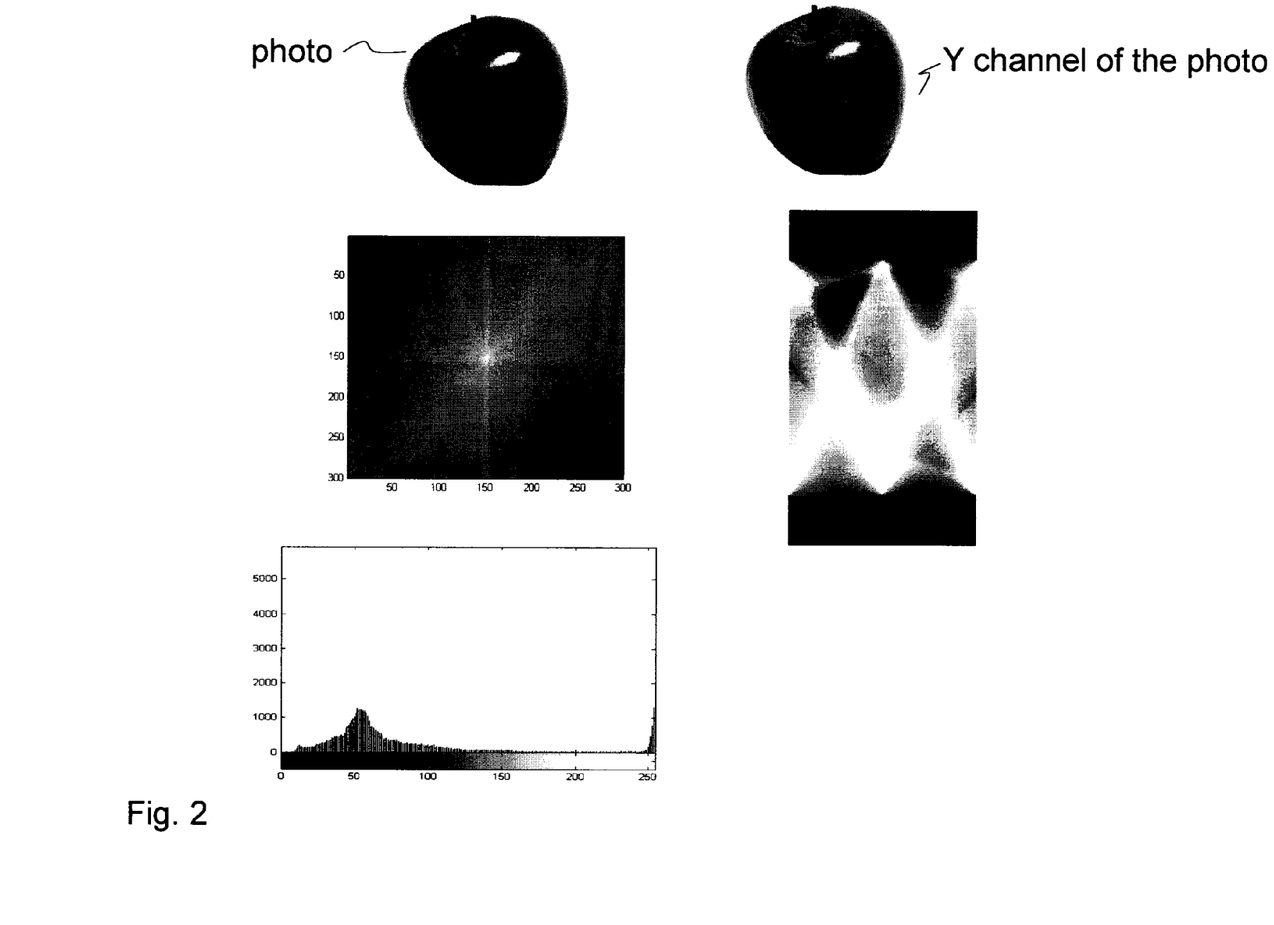
FIG. 2 exemplifies different explanatory representation data in different representation domains.

If the ontology would relate to apples or fruits at a higher level and a bottom level concept is Red Delicious having a structure as below, examples of explanatory representations are illustrated in FIG. 2.

Fruit (top level)
Apple (middle level)
Red Delicious (bottom level)
Golden Delicious (bottom level)
Red Rome (bottom level)
Granny Smith (bottom level), The explanatory representations of a Red Delicious are an actual photo, Y channel of the photo, the histogram for the Y channel, the FFT and the Radon transform of it in transform domains. The Y channel, is the luminance channel in the YUV data format, which is equivalent to the RGB data format for storing images.

These are only some examples of explanatory representations and representation domains. Different ontologies may be associated with different explanatory representations depending on the media to be classified. That implies that suitable explanatory representations when the media to be classified are photos may be images, the Y channel etc as in the case with Red Delicious as disclosed above. While if the media to be classified is audio, the explanatory representations may be low-level signal properties, Mel-frequency cepstral coefficients (MFCC), psychoacoustic features (roughness, loudness, etc).

According to embodiments of the present invention, the media to be classified is transformed to a representation domain. The transformed media is then compared with explanatory representations of the same representation domain. In this way the media can be classified when an explanatory representation in an annotation ontology is found that corresponds to the transformed media. The bottom level concept of the annotation ontology tree which is associated with the explanatory representation which corresponds to the transformed media can be applied as a tag to the media.

Figure 3:
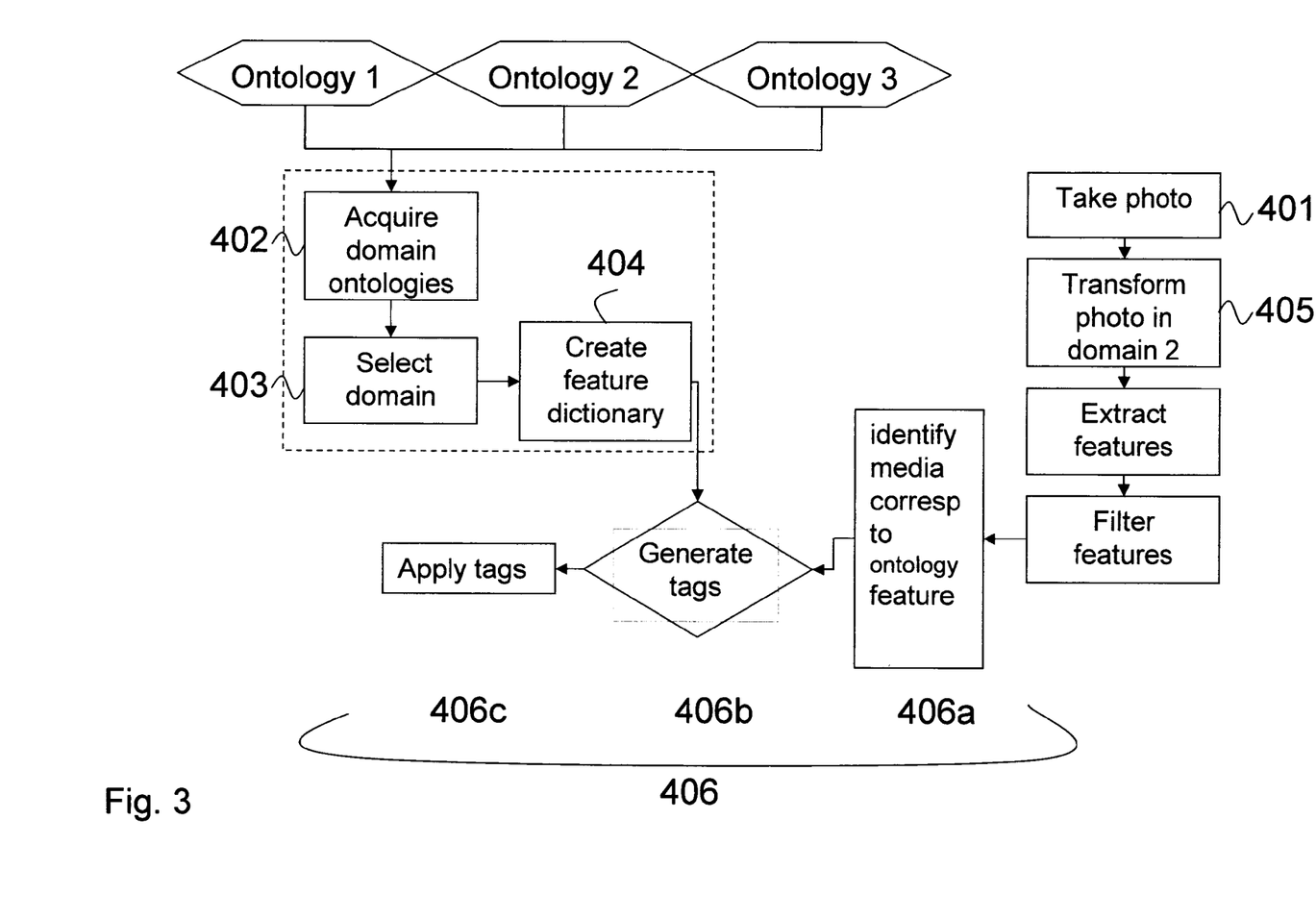
FIGS. 3-5 are flowcharts of methods according to embodiments of the present invention.
Figure 4:
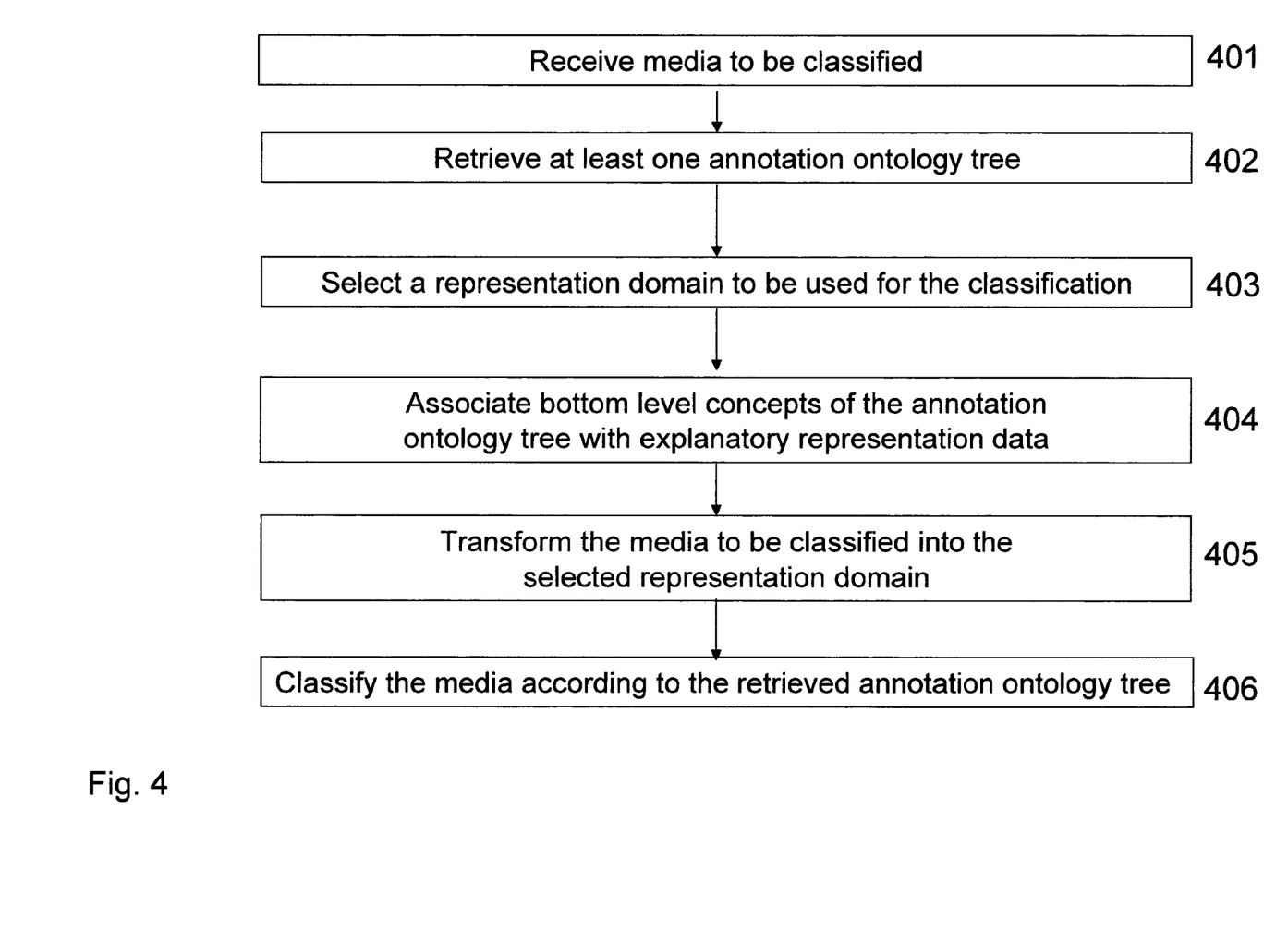
Figure 5:
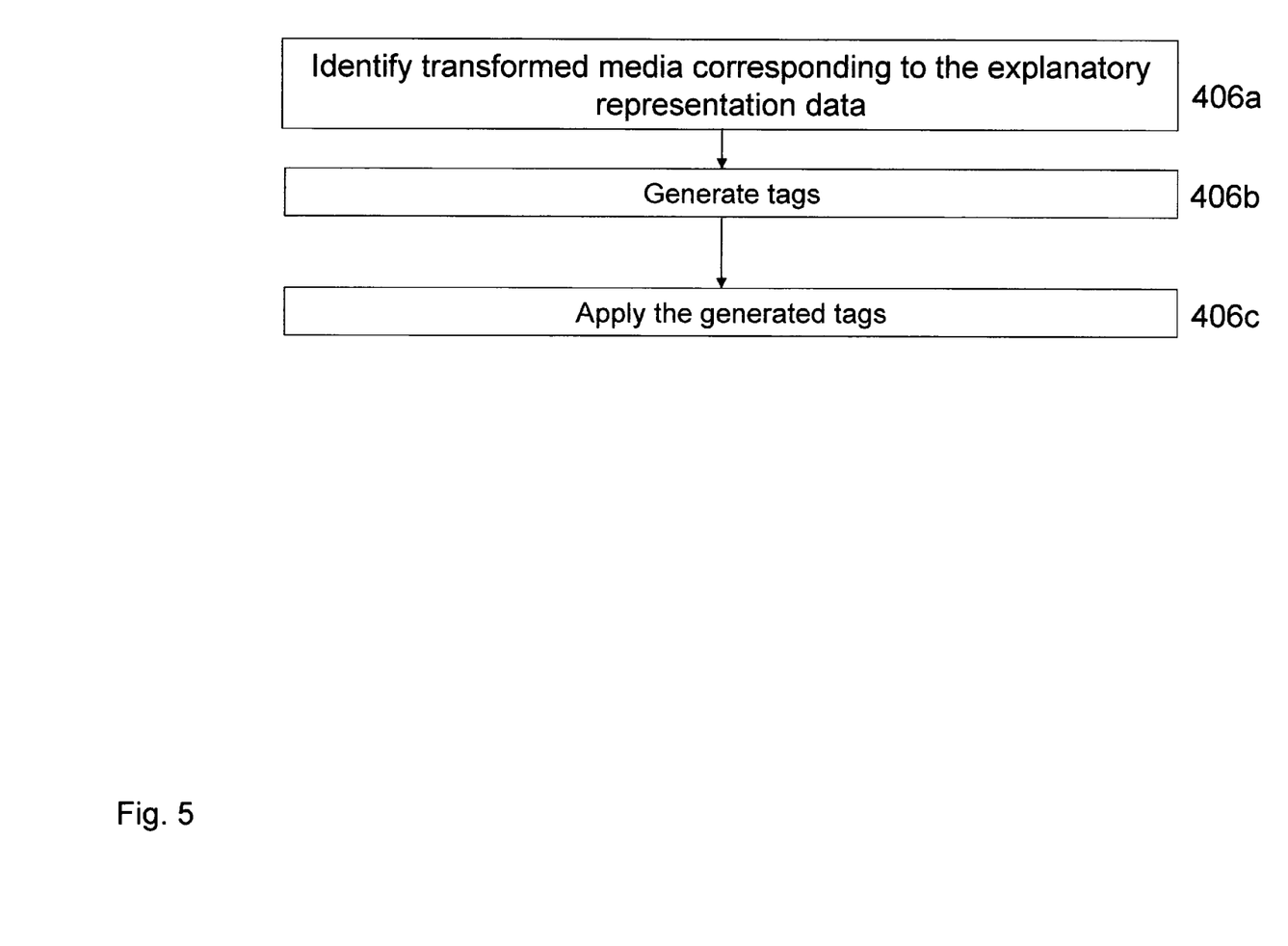

As illustrated in the flowchart of FIG. 3, a method for a media classification is provided. The media can be exemplified by image, video and audio. The media is classified and stored hierarchical according to at least one annotation ontology tree associated with a respective media class. According to embodiments where the method is implemented in a server or a user device, the media to be classified is received 401. At least one annotation ontology tree associated with a respective media class is selected and a representation domain to be used for the classification is selected 403. Further, the bottom level concepts of the annotation ontology tree are associated 404 with explanatory representation data of the selected representation domain.

A transformation of the media to be classified into the selected representation domain is received. In some embodiments when the method is performed by a server or a user device, this step implies that the media is transformed 405. Then the media is classified 406 according to the retrieved annotation ontology tree by comparing the explanatory representation data with the transformed media to be classified.

Hence, the method may either be performed in a server or in a user device. If the method is performed in the user device, the user device may download the selected annotation ontologies from a central server.

If the method is performed in the server, the user device sends the media to be classified to the server. The server may have access to user preferences associated with the user which may be used in the classification procedure as explained further below. The server has typically access to different annotation ontology dictionaries.

In a further embodiment, the method is performed by both the user device and the server. Thus, the user device receives the media to be classified and transforms the media to the selected representation domain and sends the transformed media to the server. Information regarding which representation domain the user device should transform the media to may be obtained from the server. In this further embodiment, the server retrieves 402 at least one annotation ontology tree associated with a respective media class, selects a representation domain to be used for the classification, associates 404 bottom level concepts of the annotation ontology tree with explanatory representation data of the selected representation domain, receives 405 a transformation of the media to be classified into the selected representation domain, and classifies 406 the media according to the retrieved annotation ontology tree by comparing the explanatory representation data with the transformed media to be classified.

According to an embodiment, the media is classified by identifying 406a transformed media which corresponds to the explanatory representation data. Tags are then generated 406b to the identified transformed media wherein the tags correspond to the bottom level concept, or a level above the bottom level concept, associated with the explanatory representation data. That means that the generated tags may indicate a higher level in the ontology tree than the bottom level concept. The generated tags are applied to the media to be classified accordingly.

How the generated tags are applied may depend on user input. E.g. more than one tag may be generated for one object of the media or the entire media, then the user may select which of the generated tag that should be applied. For example, if the object is a child in front of a tree, the tags indicating the tree and the child may be generated and the user can then select by an input operation which tag(s) should be applied.

In a further embodiment, the method is performed by both the user device and the server. Thus, the user device receives the media to be classified and transforms the media to the selected representation domain and sends the transformed media to the server. Information regarding which representation domain the user device should transform the media to may be obtained from the server. In this further embodiment, the server retrieves 402 at least one annotation ontology tree associated with a respective media class, selects a representation domain to be used for the classification, associates 404 bottom level concepts of the annotation ontology tree with explanatory representation data of the selected representation domain, receives a transformation of the media to be classified into the selected representation domain, and classifies 406 the media according to the retrieved annotation ontology tree by comparing the explanatory representation data with the transformed media to be classified.

The server or the user device may also transcode the explanatory representation data into a different domain. That is, if the ontology does not contain the domain representation that is required for a specific task then it is very simply for the explanatory data to be transcoded into different domains.

The embodiments exploit the existing knowledge from the enhanced ontologies to annotate media objects. Further, the embodiments can also adjust the weights by learning the preferences of the user. These preferences are revealed to the classification device, which may be a server or user device, when the user selects some of the proposed tags as the actual tags for the media under consideration.

The following example illustrates how tags may be generated according to one embodiment.

A user wants to use ontologies regarding birds, outdoor scenes and nature. The user selects them from a list presented to him by his camera-phone. The user might have to pay a fee for some of these ontologies.

Hence the camera-phone acquires knowledge domain specific ontologies regarding birds, outdoor scenes and nature. These ontologies may be downloaded from sources that give them out for free or for a price. This step can be automatic or it might require user input.

The camera-phone decides which representation domain to use, e.g. wavelet transform and shift transform. This may be done automatically by the camera-phone.

Now the user takes an outdoor photo. The photo is transformed using both wavelets and shift transform i.e. the selected representation domains are wavelets and shift transform.

Low level features are extracted from the transformed media (i.e. the photo in this case). Features of the transformed media that match the explanatory representation data from the ontologies are extracted and the rest is discarded.

An ontology dictionary is created which contains all the explanatory representation data which is associated with the bottom level concepts of the annotation ontology tree which the classification system in the camera-phone can identify. The dictionary is used as a lookup table. If a feature from the photo is not in the dictionary then it is thrown away.

An analysis is performed on the rest of the features. The analysis can come in the form of cluster analysis (k-means, HMM, etc), mixture modeling (GMM, Bayesian modeling, etc), statistical analysis (parametric and non-parametric), etc. The outcome of the above analysis is principal features, that is, the most prominent or important features. These features are the transformed media. Thus the analysis comprises a comparison of the transformed media and the explanatory data of associated with the bottom level concepts of the ontology tree. The bottom level concepts of the ontology tree corresponding to the prominent features of the photo can be used as tags which the user can choose from. Examples of tags presented to the user are birch, leporinum, altostratus, etc since the photo was taken outdoors and contains some trees and portions of the sky.

It is also possible to generalize the tags by progressing from the bottom level concepts in the ontology to middle or even top level concepts and use these as tags instead for the bottom level concepts which are associated with the explanatory data corresponding to the transformed media.

Moreover, due to the fact that the features are spatially and temporally distributed over the media for example image, the generated tags can also be spatio-temporally distributed on that media. For example, a generated tag may indicate two different objects in a special relationship to each other e.g. a book beside a pencil in an image, or a sky in top of an image, or a bird appearing before a tree in a video clip. Or, they can be aggregated as global tags for the media at its entity, i.e. one single tag can be applied to the entire image.

As mentioned above, the classification system can learn the user's preference and act accordingly.

Thus the classification system generates tags and suggests tags to the user for a given media (spatio-temporal or not). For example the user may choose from "sky" or "tree" if there is a photo of trees and the sky in the top.

The user selects some of the tags and annotates the media. In the example above, the user selects tree as the tag to annotate the photo.

The selected tag(s) is (are) feedback to the tag generation mechanism. Tags selected by the user indicate that these tags, in the future, should have higher priority whereas rejected tags should have lower priority. Accordingly, if the user has chosen tree as in the example above, tree will be generated as tag in the next photo with trees and the sky. These user preferences help the learning mechanism to readjust the weights with which it evaluates the importance of each feature.

Since the tag "trees" was selected by Alice this means that the features relevant to them should be more important to her than other features on the image. A feature weighting mechanism is employed here when learning Alice's preferences.

User input can come in an a priori or an a posteriori manner. In the a priori manner the user has already annotated an object(media). The classification system generates tags as described above and then the user provided tags are used to assess the correctness or not of the newly generated tags. In the a posteriori manner the user selects some of the tags that the classification system has generated and this process signals the user's preference towards the most suitable tags for the given object.

This implies that the user can annotate new photos when she shoots them or old photos that she had annotated in the past. For old photos she simply inputs them in the system and the system learns the user's preferences in a similar manner.

Figure 6:
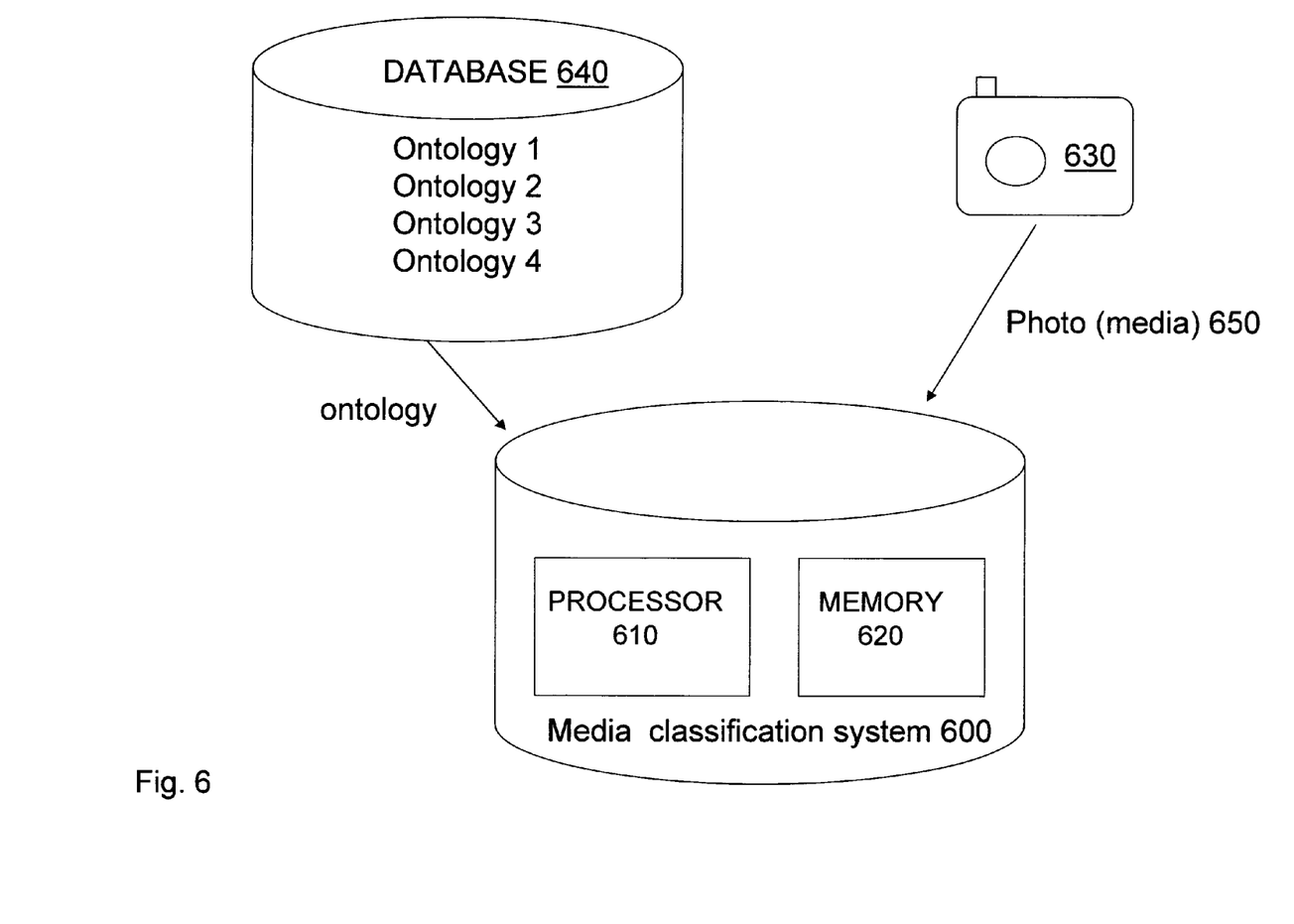
FIG. 6 illustrates schematically a server and a user device according to embodiments of the present invention.

Turning now to FIG. 6 illustrating a media classification system 600, wherein the media 650 is classified and stored hierarchical according to at least one annotation ontology tree associated with a respective media class. The system 600 is configured to retrieve at least one annotation ontology tree associated with a respective media class. The at least one annotation ontology tree may be retrieved from a database 640. The system 600 is further configured to select a representation domain to be used for the classification and to associate bottom level concepts of the annotation ontology tree with explanatory representation data of the selected representation domain. The system 600 is also configured to receive a transformation of the media 650 to be classified into the selected representation domain. If the system is implemented in the user device, the system is configured to receive the media and to perform the transformation. If the system 600 is implemented in a server, the system is configured to either receive the transformed media or to receive the media and to transform the received media. The system 600 is configured to classify the media 650 according to the retrieved annotation ontology tree by comparing the explanatory representation data with the transformed media to be classified.

According to an embodiment, the media classification system is further configured to identify transformed media corresponding to the explanatory representation data and to generate tags corresponding to the bottom level concept associated with the explanatory representation data to the identified transformed media or to generate tags corresponding to a level higher than the bottom level concept associated with the explanatory representation data to the identified transformed media.

Hence the classification system may either be implemented in a server or in a user device 630. FIG. 6 illustrates schematically when the system 600 is implemented in a server and when the server receives the media to be classified 650, which implies that the classification system is configured to perform the transformation to the selected representation domain. The functionalities of the system may be realized by a processor 610 configured to execute computer program products which are stored in a memory 620 associated with the processor. The memory 620 may also store user profile information and other information relating to user preferences.

The invention claimed is:

1. A method of generating annotation tags for classifying media, said method performed by a signal processing apparatus comprising a processor and a memory, and said method comprising:
   receiving media to be classified, said media received in electronic form;
   retrieving an annotation ontology tree associated with a respective media class and comprising a set of hierarchical descriptors for labeling objects or things with increasing specificity;
   representing the media within a selected representation domain by applying a corresponding signal transform to the media to obtain a transformed media comprising features characteristic of the media in the selected representation domain, wherein the selected representation domain is non-human perceivable;
   comparing the features of the transformed media to explanatory representation data that, within the selected representation domain, represents bottom-level descriptors in the hierarchical set of descriptors of the annotation ontology tree;
   generating a set of annotation tags from one or more of the hierarchical descriptors in the annotation ontology tree that correspond to any of the explanatory representation data that, based on the comparing, are identified as matching the features of the transformed media; and
   applying one or more of the annotation tags to the media and thereby classifying the media according to the applied tags.

2. The method according to claim 1, wherein receiving the media to be classified comprises one of: receiving the media to be classified from a memory or sub-system local to the signal processing apparatus; and receiving the media to be classified from a node that is remote from the signal processing apparatus.

3. The method according to claim 1, wherein applying the one or more annotation tags is dependent on user input.

4. The method according to claim 1, wherein applying the one or more annotation tags is dependent on user preferences.

5. The method according to claim 1, wherein the media is any of an image, video and audio.

6. The method according to claim 1, wherein the selected representation domain is a transform domain.

7. The method according to claim 6, wherein the transform domain is any of discrete cosine transform, fast fourier transform, wavelets, and histogram.

8. The method according to claim 1, wherein the selected representation domain is a statistical domain.

9. A signal processing apparatus that is configured to generate annotation tags for classifying media and comprises memory and an associated processor that is configured to:
   receive media to be classified, said media received in electronic form;
   retrieve an annotation ontology tree associated with a respective media class and comprising a set of hierarchical descriptors for labeling objects or things with increasing specificity;
   represent the media within a selected representation domain by applying a corresponding signal transform to the media to obtain a transformed media comprising features characteristic of the media in the selected representation domain, wherein the selected representation domain is non-human perceivable;
   compare the features of the transformed media to explanatory representation data that, within the selected representation domain, represents bottom-level descriptors in the set of hierarchical descriptors of the annotation ontology tree;
   generate a set of annotation tags from one or more of the hierarchical descriptors in the annotation ontology tree that correspond to any of the explanatory representation data that, based on the comparing, are identified as matching the features of the transformed media; and
   apply one or more of the annotation tags to the media and thereby classify the media according to the applied tags.

10. The signal processing apparatus according to claim 9, wherein the signal processing apparatus is further configured to receive the media to be classified according to one of: receiving the media from a memory or sub-system that is local to the signal processing apparatus; and receiving the media from a node that is remote from the signal processing apparatus.

11. The signal processing apparatus according to claim 9, wherein the signal processing apparatus is configured to apply the one or more annotation tags in dependence on user input.

12. The signal processing apparatus according to claim 9, wherein the signal processing apparatus is configured to apply the one or more annotation tags in dependence on user preferences.

13. The signal processing apparatus according to claim 9, wherein the media is any of an image, video and audio.

14. The signal processing apparatus according to claim 9, wherein the selected representation domain is a transform domain.

15. The signal processing apparatus according to claim 14, wherein the transform domain is any of discrete cosine transform, fast fourier transform, wavelets, and histogram.

16. The signal processing apparatus according to claim 9, wherein the selected representation domain is a statistical domain.

* * * * *